United States Patent

Nagashima et al.

(10) Patent No.: US 9,243,084 B2
(45) Date of Patent: Jan. 26, 2016

(54) METHOD FOR PRODUCING CHLORINATED HYPERBRANCHED POLYMER

(75) Inventors: Hideo Nagashima, Fukuoka (JP); Keisuke Kojima, Funabashi (JP); Akihiro Tanaka, Funabashi (JP); Keisuke Odoi, Chiyoda-ku (JP); Osamu Uesugi, Chiyoda-ku (JP)

(73) Assignees: KYUSHU UNIVERSITY, Fukuoka (JP); NISSAN CHEMICAL INDUSTRIES, LTD., Tokyo (JP)

( * ) Notice: Subject to any disclaimer, the term of this patent is extended or adjusted under 35 U.S.C. 154(b) by 105 days.

(21) Appl. No.: 14/003,911

(22) PCT Filed: Mar. 2, 2012

(86) PCT No.: PCT/JP2012/055437
§ 371 (c)(1), (2), (4) Date: Nov. 12, 2013

(87) PCT Pub. No.: WO2012/121165
PCT Pub. Date: Sep. 13, 2012

(65) Prior Publication Data
US 2014/0073744 A1  Mar. 13, 2014

(30) Foreign Application Priority Data
Mar. 10, 2011 (JP) .................. 2011-053600

(51) Int. Cl.
C08F 8/20 (2006.01)
C08F 8/18 (2006.01)

(52) U.S. Cl.
CPC .... *C08F 8/20* (2013.01); *C08F 8/18* (2013.01)

(58) Field of Classification Search
None
See application file for complete search history.

(56) References Cited

U.S. PATENT DOCUMENTS

| 2008/0139692 A1 | 6/2008 | Ishizu et al. |
| 2008/0249254 A1 | 10/2008 | Ennis |
| 2010/0048845 A1* | 2/2010 | Yasui et al. ........... 526/204 |
| 2010/0311933 A1 | 12/2010 | Tanaka et al. |

FOREIGN PATENT DOCUMENTS

| JP | A-60-144306 | 7/1985 |
| JP | A-2010-523759 | 7/2010 |
| WO | WO 2006/093050 A1 | 9/2006 |
| WO | WO 2008/029688 A1 | 3/2008 |
| WO | WO 2009/035042 A1 | 3/2009 |
| WO | WO 2010/101254 A1 | 9/2010 |

OTHER PUBLICATIONS

May 22, 2012 International Search Report issued in International Application No. PCT/JP2012/055437.

May 22, 2012 Written Opinion issued in International Application No. PCT/JP2012/055437.

Ishizu et al., "Synthesis of hyperbranched polymers by self-addition free radical vinyl polymerization of photo functional styrene," *Macromolecular Rapid Communications*, Jul. 7, 2000, pp. 665-668, vol. 21, No. 10, Wiley-VCH.

Ishizu et al., "Novel synthesis of branched polystyrenes by quasi-living radical copolymerization using photofunctional inimer," *Polymer International*, Aug. 2001, pp. 906-910, vol. 50, No. 8, Society of Chemical Industry.

Ishizu et al., "Kinetics of Hyperbranched Polystyrenes by Free Radical Polymerization of Photofunctional Inimer," *Macromolecules*, Apr. 23, 2002, pp. 3781-3784, vol. 35, No. 9, American Chemical Society.

(Continued)

*Primary Examiner* — Robert C Boyle
(74) *Attorney, Agent, or Firm* — Oliff PLC

(57) ABSTRACT

There is provided a novel production method of a chlorinated hyperbranched polymer that is optically stable and is capable of derivatizing the chlorinated hyperbranched polymer into various compounds. A production method of a chlorinated hyperbranched polymer for producing a chlorinated hyperbranched polymer of Formula (1):

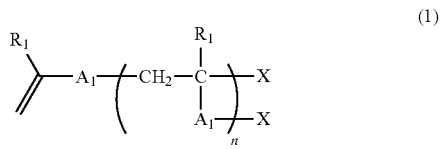

{where X is a chlorine atom; $R_1$ is a hydrogen atom or a methyl group; and $A_1$ is a phenylene-alkylene group, n is the number of repeating unit structures and is an integer of 2 to 100,000}, comprising the step of substituting a dithiocarbamate group of a hyperbranched polymer of Formula (3):

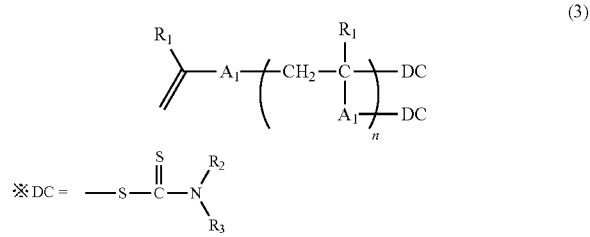

(where $R_1$, $A_1$, and n are the same as defined in Formula (1); and each of $R_2$ and $R_3$ is a $C_{1-5}$ alkyl group, a $C_{1-5}$ hydroxyalkyl group, or a $C_{7-12}$ arylalkyl group, or $R_2$ and $R_3$ optionally form a ring together with a nitrogen atom bonded to $R_2$ and $R_3$) with a chlorine atom using sulfuryl chloride.

2 Claims, 1 Drawing Sheet

(56) References Cited

OTHER PUBLICATIONS

Ishizu et al., "Synthesis and characterization of hyperbranched poly(ethyl methacrylate) by quasi-living radical polymerization of photofunctional inimer," *Polymer International*, May 2002, pp. 424-428, vol. 51, No. 5, Society of Chemical Industry.

Ishizu et al., "Kinetics on Formation of Hyperbranched Poly(ethyl methacrylate) via a Controlled Radical Mechanism of Photofunctional Inimer," *Macromolecules*, May 20, 2003, pp. 3505-3510, vol. 36, No. 10, American Chemical Society.

Ishizu et al., "Novel synthesis and solution properties of hyperbranched poly(ethyl methacrylate)s by quasi-living radical copolymerization using photofunctional inimer," *Polymer International*, Mar. 2004, pp. 259-265, vol. 53, No. 3, Society of Chemical Industry.

* cited by examiner

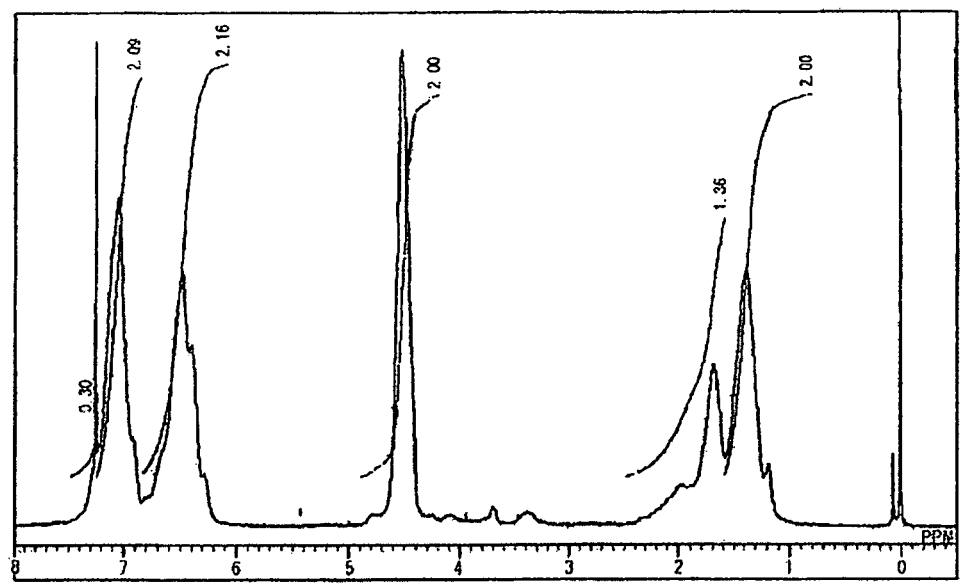

METHOD FOR PRODUCING CHLORINATED HYPERBRANCHED POLYMER

TECHNICAL FIELD

The present invention relates to a novel production method of a chlorinated hyperbranched polymer and more in detail, the present invention relates to a production method capable of producing a chlorinated hyperbranched polymer having stable product quality even in a mass production on an industrial scale.

The chlorinated hyperbranched polymer obtained by the present production method is preferably utilized as paints, inks, adhesives, resin fillers, various molding materials, nanometer-sized pore forming agents, chemical and mechanical abrasives, supporting materials for functional substances such as catalysts, nanocapsules, photonic crystals, resist materials, optical materials, electronic materials, information recording materials, printing materials, battery materials, medical materials, magnetic materials, intermediate raw materials, and the like.

BACKGROUND ART

Hyperbranched polymers classified as dendritic polymers have a specific structure having intentionally introduced branches. With such a structure, dendritic polymers have various characteristics in a respect of having a nanometer size, a respect of being capable of forming surfaces having many functional groups, a respect of being rendered having a low viscosity compared to linear polymers, a respect of exhibiting a behavior like fine particles with little entanglement between molecules, a respect of being capable of becoming amorphous with their solubility in a solvent controllable, and the like. Accordingly, various practical applications are expected utilizing these characteristics.

Particularly, having a large number of terminal groups is regarded as the most remarkable characteristic of dendritic polymers. In such a dendritic polymer having a large number of terminal groups, intermolecular interactions depend largely on the types of the terminal groups, resulting in large variations in its glass transition temperature, solubility, thin film forming properties, or the like. Accordingly, such a dendritic polymer has characteristics which no general linear polymer has. When reactive functional groups are added as terminal groups to such a dendritic polymer, the polymer has reactive functional groups in extremely high density. Therefore, its applications as, for example, a high sensitive scavenger for functional substances such as a catalyst, a high sensitive multifunctional crosslinking agent, a dispersant or a coating agent for metals or metal oxides are also expected. That is, in dendritic polymers, selection of the types of the terminal groups becomes an important factor for exhibiting characteristics of the polymer.

An advantage of the hyperbranched polymer over other dendrimers is in its simplicity for synthesis, which is extremely advantageous particularly in an industrial production. Generally, while the dendrimer is synthesized by repeating protection and deprotection, the hyperbranched polymer is synthesized by a one-step polymerization of a so-called ABx type monomer having in one molecule thereof, a total of three or more substituents of two types.

As a synthesis method thereof, known is a method for synthesizing a hyperbranched polymer by a living radical polymerization of a compound having a vinyl group while having a photo-polymerization initiating ability. For example, known are a synthesis method of a hyperbranched polymer by a photo-polymerization of a styrene compound having a dithiocarbamate group (see Non-Patent Documents 1, 2 and 3), and a synthesis method of a hyperbranched polymer having a dithiocarbamate group by a photo-polymerization of an acrylic compound having a dithiocarbamate group (see Non-Patent Documents 4, 5 and 6).

SUMMARY OF THE INVENTION

Problem to be Solved by the Invention

The above-described conventionally developed hyperbranched polymer has in the molecule thereof, a dithiocarbamate group having a photo-polymerization initiating ability, so that it remains in a living state relative to light and is optically unstable.

In order to convert the polymer terminal into a functional group such as a hydroxy group and an ether group so as to apply the hyperbranched polymer to various materials, it is desired to convert a dithiocarbamate group at the polymer terminal into a reactive functional group beforehand.

Thus, a novel production method of an optically stable hyperbranched polymer having a functional group capable of derivatizing the hyperbranched polymer into various compounds has been desired.

Means for Solving the Problem

As a result of assiduous research for solving the above problem, the inventors of the present invention have studied the production of a hyperbranched polymer having halogen terminals, particularly chlorine terminals from viewpoints of being optically stable and capable of being easily derivatized into various compounds, preservation stability, and homogeneity of the product quality. Then, the inventors of the present invention have found that in the production method, by using sulfuryl chloride as a halogenation (chlorination) agent and by variously selecting the condition of the reaction between sulfuryl chloride and a hyperbranched polymer having dithiocarbamate group terminals, the production method becomes capable of efficiently obtaining a chlorinated hyperbranched polymer having stable product quality even in a mass production, and have completed the present invention.

That is, the present invention relates to, according to a first aspect, a production method of a chlorinated hyperbranched polymer for producing a chlorinated hyperbranched polymer of Formula (1):

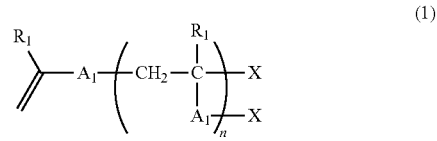

{where X is a chlorine atom; $R_1$ is a hydrogen atom or a methyl group; and $A_1$ is a structure of Formula (2):

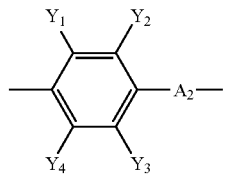
(2)

(where $A_2$ is a linear, branched, or cyclic alkylene group having a carbon atom number of 1 to 30 optionally containing an ether bond or an ester bond; and each of $Y_1, Y_2, Y_3$, and $Y_4$ is a hydrogen atom, a $C_{1-20}$ alkyl group, a $C_{1-20}$ alkoxy group, a nitro group, a hydroxy group, an amino group, a carboxy group, or a cyano group); and n is the number of repeating unit structures and is an integer of 2 to 100,000}, the production method characterized by:

comprising the step of substituting a dithiocarbamate group of a hyperbranched polymer of Formula (3):

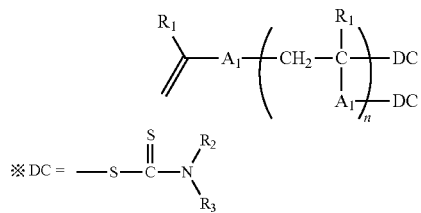
(3)

(where $R_1, A_1$, and n are the same as defined in Formula (1); and each of $R_2$ and $R_3$ is a $C_{1-5}$ alkyl group, a $C_{1-5}$ hydroxyalkyl group, or a $C_{7-12}$ arylalkyl group, or $R_2$ and $R_3$ optionally form a ring together with a nitrogen atom bonded to $R_2$ and $R_3$)

having a dithiocarbamate group at a molecular terminal of the hyperbranched polymer, with a chlorine atom using sulfuryl chloride; and using sulfuryl chloride in an amount of 2.5 to 10 times mole equivalent relative to the number of dithiocarbamate groups.

The present invention relates to, according to a second aspect, the production method according to the first aspect, characterized in that the step of substituting a dithiocarbamate group of the hyperbranched polymer of Formula (3) having a dithiocarbamate group at a molecular terminal of the hyperbranched polymer with a chlorine atom is performed by charging all at once, continuously, or in fractional amounts, the hyperbranched polymer having a dithiocarbamate group at a molecular terminal of the hyperbranched polymer into a solution of sulfuryl chloride in an organic solvent.

The present invention relates to, according to a third aspect, the production method according to the first aspect or the second aspect, characterized in that the step of substituting a dithiocarbamate group of the hyperbranched polymer of Formula (3) having a dithiocarbamate group at a molecular terminal of the hyperbranched polymer with a chlorine atom is performed under a condition of a temperature of −20° C. or more and 35° C. or less.

Effects of the Invention

By the production method of the present invention, a hyperbranched polymer can be simply and efficiently obtained that has a chlorine atom as a reactive functional group at a molecular terminal, is optically stable, can be easily derivatized into various compounds, and is excellent in preservation stability.

Particularly according to the present invention, in the mass production of the chlorinated hyperbranched polymer, during the production thereof, insolubilization does not occur and a side reaction that may adversely affect the development to applications thereafter is not likely occur, so that the present invention can obtain a chlorinated hyperbranched polymer having homogeneous product quality and can provide an extremely useful production method for a large scale production on the industrial scale.

BRIEF DESCRIPTION OF THE DRAWING

FIG. 1 is a graph showing a $^1$H NMR spectrum of HPS-Cl obtained in Example 3.

MODES FOR CARRYING OUT THE INVENTION

The present invention is a production method of a chlorinated hyperbranched polymer of Formula (1):

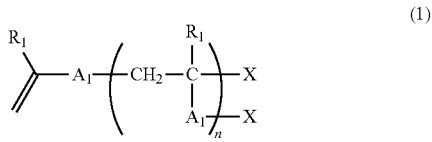
(1)

In Formula (1), X is a chlorine atom and $R_1$ is a hydrogen atom or a methyl group. n is the number of repeating unit structures and is an integer of 2 to 100,000. $A_1$ is a structure of Formula (2):

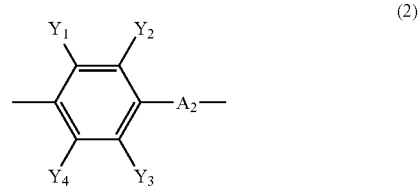
(2)

In Formula (2), $A_2$ is a linear, branched or cyclic $C_{1-30}$ alkylene group optionally containing an ether bond or an ester bond, and each of $Y_1, Y_2, Y_3$, and $Y_4$ is a hydrogen atom, a $C_{1-20}$ alkyl group, a $C_{1-20}$ alkoxy group, a nitro group, a hydroxy group, an amino group, a carboxy group, or a cyano group.

Specifically, the present invention relates to a production method of a chlorinated hyperbranched polymer of Formula (1), characterized in that a dithiocarbamate group of a hyperbranched polymer of Formula (3) below having a dithiocarbamate group at a molecular terminal thereof is substituted with a chlorine atom using sulfuryl chloride as a halogenation agent and at this time, sulfuryl chloride is used in an amount of 2.5 to 10 times mole equivalent relative to the number of dithiocarbamate groups.

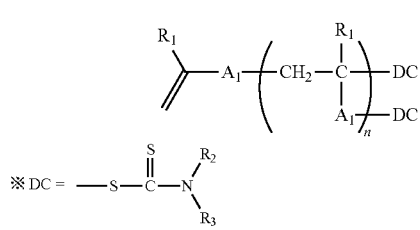

In Formula (3), $R_1$, $A_1$, and n are the same as defined in Formula (1).

Each of $R_2$ and $R_3$ is a $C_{1-5}$ alkyl group, a $C_{1-5}$ hydroxyalkyl group, or a $C_{7-12}$ arylalkyl group, or $R_2$ and $R_3$ optionally form a ring together with a nitrogen atom bonded to $R_2$ and $R_3$.

The detail of specific examples for each group ($R_1$ to $R_3$, $A_2$) in Formula (1) and Formula (3) and the hyperbranched polymer having a dithiocarbamate group at a molecular terminal thereof that is used in the present invention is described below.

The production method of the present invention has a noticeable characteristic in such respects as a respect of selecting sulfuryl chloride as a halogenation agent and a respect of using sulfuryl chloride in a specific amount (excessive amount) relative to the amount of the dithiocarbamate group.

As described above, in the hyperbranched polymer having a dithiocarbamate group at a molecular terminal thereof, when the photostability of the hyperbranched polymer, the easiness of derivatizing the hyperbranched polymer into various compounds, and the like are taken into consideration, it is desired to convert the dithiocarbamate group terminal into a halogen terminal beforehand and conventionally studied was a hyperbranched polymer having a bromine terminal. However, a hyperbranched polymer having a bromine terminal has extremely high reactivity and although such a hyperbranched polymer is advantageous from the viewpoint of derivatization into other compounds, from the viewpoints of preservation stability and homogeneity of the product quality, particularly when the large scale production on the industrial scale is taken into consideration, such a hyperbranched polymer is regarded as disadvantageous. Therefore, from the viewpoint of stability, a hyperbranched polymer having a chlorine terminal is regarded as advantageous.

For studying the production of the hyperbranched polymer having a chlorine terminal, the inventors of the present invention have attempted chlorination by various chlorination agents which have been conventionally developed such as chlorine, N-chlorosuccinimide, chlorinated isocyanuric acid, and thionyl chloride. However, when an actual chlorination process, particularly a mass production process on the industrial scale is taken into consideration, caused are problems such as difficulty in handling (chlorine gas and the like), occurrence of a chlorination agent residue (N-chlorosuccinimide and the like) and insolubilization (thionyl chloride and the like) of the reaction system, and thus, in the application of the above chlorination agents which have been conventionally developed, there remain problems as mentioned above.

As the result of studying the applicability of various chlorination agents, the inventors of the present invention have found for the first time, that sulfuryl chloride (liquid) is an extremely useful chlorination agent in the production of the chlorinated hyperbranched polymer from such viewpoints that sulfuryl chloride can be easily handled in comparison with a chlorine gas, that a chlorination residue does not remain from sulfuryl chloride, so that the chlorinated product can be easily purified, and that the objective polymer can be obtained without insolubilization of the reaction system.

The inventors of the present invention have found that not only the selection of sulfuryl chloride as a chlorination agent, but also the used amount thereof are extremely important and only when sulfuryl chloride is used in a specific amount excessive relative to the dithiocarbamate group of the hyperbranched polymer and further, only when the addition method of both compounds and the reaction temperature are variously selected, a chlorinated hyperbranched polymer having stable product quality can be obtained without insolubilization of the reaction system, and have completed the present invention.

Hereinafter, the present invention will be described more in detail.

[Production Method of Chlorinated Hyperbranched Polymer of Formula (1) by Chlorination of Dithiocarbamate Group]

In the present production method, sulfuryl chloride used as a halogenation agent is used in an amount of 2.5 to 10 times mole equivalent relative to the number of dithiocarbamate groups in the hyperbranched polymer. Sulfuryl chloride is used in an amount of preferably 3.0 to 10 times mole equivalent and more preferably 3.5 to 5.0 times mole equivalent relative to the number of dithiocarbamate groups in the hyperbranched polymer.

A reaction for substituting a dithiocarbamate group at a molecular terminal with a chlorine atom is effected preferably in water or an organic solvent. At this time, it is preferred to charge the hyperbranched polymer having a dithiocarbamate group into a reaction system in which sulfuryl chloride is in an excessive state and, for example, it is preferred to effect the reaction by charging a solution prepared by dissolving the hyperbranched polymer having a dithiocarbamate group in an organic solvent into a solution prepared by dissolving sulfuryl chloride in an organic solvent. At this time, the method for charging the solution of the hyperbranched polymer having a dithiocarbamate group into the sulfuryl chloride solution may be any one of charging all at once, continuously charging (such as dropping), and charging in fractional amounts over several times.

The organic solvent used for the substitution reaction is preferably an organic solvent capable of dissolving the hyperbranched polymer having a dithiocarbamate group and sulfuryl chloride. In the case where the hyperbranched polymer having a dithiocarbamate group is produced in advance, when a solvent used for the production thereof and an organic solvent used for the substitution reaction are the same as each other, the reaction operation becomes simple, which is preferred.

The organic solvent used for the substitution reaction may be an organic solvent that does not remarkably inhibit the progression of the present reaction and specific examples thereof include: organic acids such as acetic acid; aromatic hydrocarbons such as benzene, toluene, xylene, ethylbenzene, and 1,2-dichlorobenzene; ethers such as tetrahydrofuran and diethyl ether; ketones such as acetone, methyl ethyl ketone, methyl isobutyl ketone, and cyclohexanone; halides such as chloroform, dichloromethane, and 1,2-dichloroethane; and aliphatic hydrocarbons such as n-heptane, n-hexane, and cyclohexane. One of these organic solvents may be used, and a mixture of two or more of them may be used.

The total amount of the organic solvent used for the substitution reaction is 0.2 to 1,000 times mass, preferably 1 to 500 times mass, more preferably 5 to 100 times mass, and most preferably 10 to 50 times mass relative to the mass of the hyperbranched polymer having a dithiocarbamate group at a molecular terminal thereof.

The substitution reaction is desirably effected under a temperature condition of preferably −20° C. or more and 35° C. or less, more preferably −15° C. or more and 25° C. or less, and most preferably −5° C. or more and 20° C. or less.

For the substitution reaction, it is necessary to remove thoroughly oxygen in the reaction system before the reaction initiation and it is satisfactory to purge the inside of the reaction system with an inert gas such as nitrogen and argon.

The reaction time is 0.01 to 100 hours and preferably 0.1 to 10 hours.

After the completion of the reaction, it is desired to subject sulfuryl chloride remaining in the reaction system to a decomposition treatment and at this time, there can be used an aqueous solution of a reductant such as sodium thiosulfate and sodium sulfite or an alkaline aqueous solution of sodium hydroxide, potassium hydroxide, calcium hydroxide, or the like. Remaining sulfuryl chloride may be reacted with a compound containing an unsaturated bond such as ethylene, propylene, butene, and cyclohexene.

The used amount of these compounds may be 0.1 to 50 equivalents and preferably 0.5 to 10 equivalents relative to used sulfuryl chloride.

The chlorinated hyperbranched polymer obtained by the above reaction can be separated from a solvent by distilling off the solvent from the reaction solution or by solid-liquid separation of the reaction solution. The chlorinated hyperbranched polymer can be recovered as a powder by charging the reaction solution into a poor solvent to precipitate the chlorinated hyperbranched polymer.

Examples of the poor solvent include water, methanol, isopropanol, n-hexane, and n-heptane. One of these poor solvents may be used, and a mixture of two or more of them may be used. The poor solvent is desirably used in an amount of preferably 1 to 50 times mass and more preferably 2 to 10 times mass relative to the mass of the solvent (good solvent) of the reaction solution.

In the hyperbranched polymer obtained by the present invention, a part of molecular terminals may remain as a dithiocarbamate group.

The chlorinated hyperbranched polymer obtained by the present invention has a weight-average molecular weight Mw measured by the gel permeation chromatography in terms of polystyrene of 500 to 5,000,000, preferably 1,000 to 1,000,000, more preferably 2,000 to 500,000, and most preferably 3,000 to 100,000. The chlorinated hyperbranched polymer of the present invention has a degree of distribution (Mw (weight-average molecular weight)/Mn (number-average molecular weight)) of 1.0 to 7.0, preferably 1.1 to 6.0, and more preferably 1.2 to 5.0.

[Hyperbranched Polymer Having Dithiocarbamate Group at Molecular Terminal Thereof]

The hyperbranched polymer having a dithiocarbamate group at a molecular terminal thereof which is used in the production method of the present invention is a hyperbranched polymer of Formula (3):

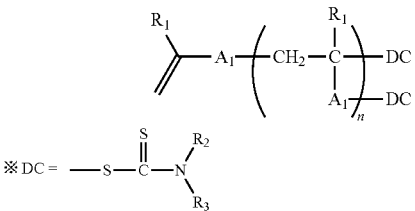

In Formula (3), $R_1$ is a hydrogen atom or a methyl group.

Each of $R_2$ and $R_3$ is a $C_{1-5}$ alkyl group, a $C_{1-5}$ hydroxyalkyl group, or a $C_{7-12}$ arylalkyl group, or $R_2$ and $R_3$ optionally form a ring together with a nitrogen atom bonded to $R_2$ and $R_3$.

Examples of the $C_{1-5}$ alkyl group as $R_2$ and $R_3$ include a methyl group, an ethyl group, an isopropyl group, a tert-butyl group, a cyclopentyl group, and an n-pentyl group. Examples of the $C_{1-5}$ hydroxyalkyl group as $R_2$ and $R_3$ include a hydroxymethyl group, a hydroxyethyl group, and a hydroxypropyl group. Examples of the $C_{7-12}$ arylalkyl group as $R_2$ and $R_3$ include a benzyl group and a phenethyl group.

Examples of the ring formed by $R_2$ and $R_3$ which are bonded with each other together with a nitrogen atom bonded to $R_2$ and $R_3$ include 4- to 8-membered rings. Examples of the ring include rings containing four to six methylene groups. Examples of the ring include rings containing an oxygen atom or a sulfur atom and containing four to six methylene groups. Specific examples of the ring formed by $R_2$ and $R_3$ which are bonded with each other together with a nitrogen atom bonded to $R_2$ and $R_3$ include a piperidine ring, a pyrrolidine ring, a morpholine ring, a thiomorpholine ring, and a homopiperidine ring.

In Formula (3), $A_1$ is a structure of Formula (2):

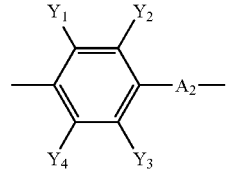

In Formula (2), $A_2$ is a linear, branched, or cyclic alkylene group having a carbon atom number of 1 to 30 optionally containing an ether bond or an ester bond and each of $Y_1$, $Y_2$, $Y_3$, and $Y_4$ is a hydrogen atom, a $C_{1-20}$ alkyl group, a $C_{1-20}$ alkoxy group, a nitro group, a hydroxy group, an amino group, a carboxy group, or a cyano group.

Specific examples of the alkylene group as $A_2$ include a linear alkylene group such as a methylene group, an ethylene group, an n-propylene group, an n-butylene group, and an n-hexylene group and a branched alkylene group such as an isopropylene group, an isobutylene group, and a 2-methylpropylene group. Examples of the cyclic alkylene group as $A_2$ include an alicyclic aliphatic group having a $C_{3-30}$ monocyclic structure, a polycyclic structure, and a crosslinked cyclic structure. Specific examples thereof include groups having a $C_4$ or more monocyclic structure, a bicyclic structure, a tricyclic structure, a tetracyclic structure, and a pentacyclic structure. For example, structural examples (a) to (s) of the alicyclic part in the alicyclic aliphatic group are shown as follows.

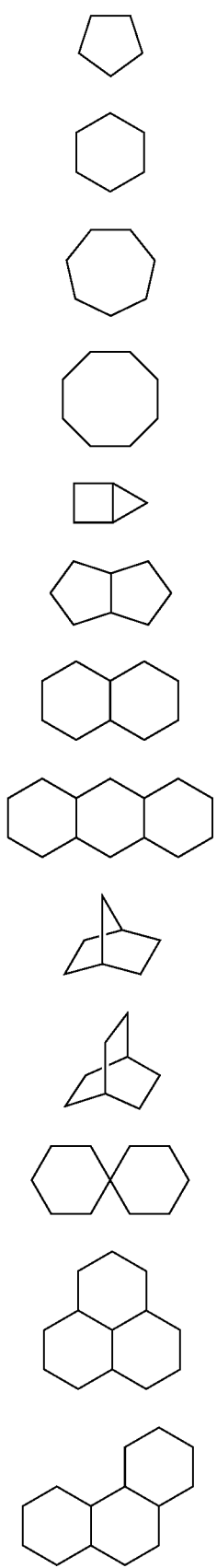

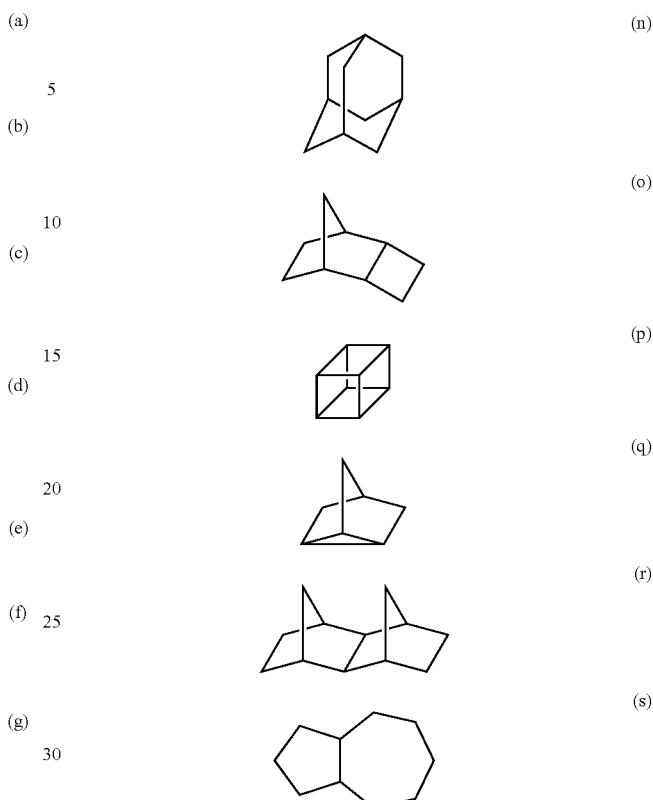

In Formula (2), examples of the $C_{1-20}$ alkyl group as $Y_1$, $Y_2$, $Y_3$, and $Y_4$ include a methyl group, an ethyl group, an isopropyl group, a cyclohexyl group, and an n-pentyl group. Examples of the $C_{1-20}$ alkoxy group as $Y_1$, $Y_2$, $Y_3$, and $Y_4$ include a methoxy group, an ethoxy group, an isopropoxy group, a cyclohexyloxy group, and an n-pentyloxy group. $Y_1$, $Y_2$, $Y_3$, and $Y_4$ are each preferably a hydrogen atom or a $C_{1-20}$ alkyl group.

$A_1$ in Formula (1) is preferably a structure of Formula (4):

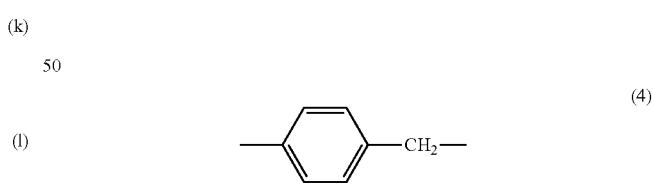

(4)

As the hyperbranched polymer of Formula (3) having a dithiocarbamate group at a molecular terminal thereof, a commercially available product can be used. As the commercially available product, HYPERTECH (registered trademark) HPS-200 manufactured by Nissan Chemical Industries, Ltd. can be preferably used.

The hyperbranched polymer of Formula (3) having a dithiocarbamate group at a molecular terminal thereof is obtained by subjecting a dithiocarbamate compound of Formula (5):

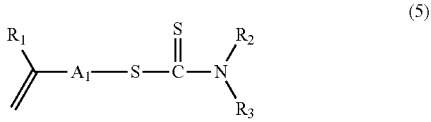

to living radical polymerization.

In Formula (5), $R_1$, $R_2$, $R_3$, and $A_1$ are the same as defined above.

Specific examples of the dithiocarbamate compound of Formula (5) include N,N-diethyldithiocarbamylmethylstyrene.

Living radical polymerization of the dithiocarbamate compound of Formula (5) can be performed referring to a method described in Macromolecules Vol. 35, No. 9, 3781-3784 (2002) or Macromolecules Vol. 36, No. 10, 3505-3510 (2002), or a procedure described in International Publication No. WO 2008/029688 pamphlet.

The dithiocarbamate compound of Formula (5) can be easily obtained by a nucleophilic substitution reaction between a compound of Formula (6) and a compound of Formula (7):

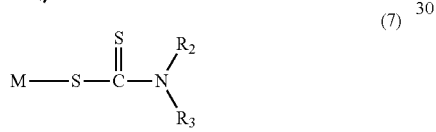

In the above Formulae, $R_1$, $R_2$, $R_3$, and $A_1$ are the same as defined above.

In Formula (6), Y is a leaving group. Examples of the leaving group include a fluoro group, a chloro group, a bromo group, an iodo group, a mesyl group, and a tosyl group. In Formula (7), M is lithium, sodium, or potassium.

The present nucleophilic substitution reaction is preferably effected usually in an organic solvent capable of dissolving both the above two types of compounds. After the completion of the reaction, by performing a phase separation processing by water/nonaqueous organic solvent and a recrystallization processing, the dithiocarbamate compound of Formula (5) can be obtained in a high purity.

The dithiocarbamate compound of Formula (5) can be produced referring to a method described in Macromol. Rapid Commun. 21, 665-668 (2000) or Polymer International 51, 424-428 (2002).

EXAMPLES

Hereinafter, the present invention is described more specifically referring to Examples which should not be construed as limiting the scope of the present invention. In Examples, the measurement of physical properties of a sample was performed under the following conditions using the following apparatuses.

(1) GPC (Gel Permeation Chromatography)

Apparatus: HLC-8220GPC manufactured by Tosoh Corporation

Column: Shodex (registered trade mark) KF-804L+KF-803L manufactured by Showa Denko K.K.

Column temperature: 40° C.

Solvent: Tetrahydrofuran

Detector: UV (254 nm), RI (2) $^1$H NMR spectrum

Apparatus: JNM-L400 manufactured by JEOL LTD.

Solvent: $CDCl_3$

Internal standard: Tetramethylsilane (0.00 ppm)

Abbreviations of the used reagents are as follows.

HPS: hyperbranched polystyrene [HYPERTECH (registered trade mark) HPS-200 manufactured by Nissan Chemical Industries, Ltd.]

IPA: isopropanol

Example 1

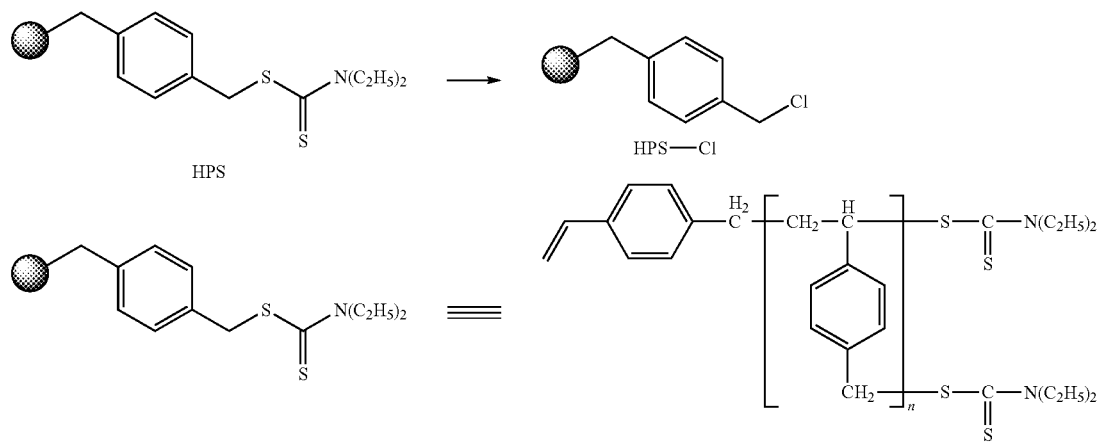

Into a 50 mL reaction flask, 1.5 g (5.7 mmol as a dithiocarbamate group (hereinafter, a DC group)) of a hyperbranched polymer HPS having a DC group at a molecular terminal thereof and 7.5 g of chloroform were charged and the resultant mixture was stirred in a nitrogen stream until the mixture became homogeneous.

Into another 50 mL two-neck flask, 2.7 g (20 mmol, 3.6 equivalent relative to a DC group) of sulfuryl chloride [manufactured by Kishida Chemical Co., Ltd.] and 7.5 g of chloroform were charged, the resultant mixture was stirred, and the sulfuryl chloride was dissolved homogeneously, followed by purging the inside of the reaction system with nitrogen. Into the sulfuryl chloride/chloroform solution, the above HPS/chloroform solution was charged all at once and the resultant reaction mixture was stirred under heating-reflux (at about 61° C.) for 6 hours.

Then, to the reaction mixture, 1.7 g (20 mmol, 1.0 equivalent relative to sulfuryl chloride) of cyclohexene [manufactured by Tokyo Chemical Industry Co., Ltd.] was added. After the addition, the resultant reaction mixture was charged into 60 g of IPA to precipitate a polymer. The precipitate was filtered to obtain a powder which was washed with 10 g of IPA and was vacuum-dried at 40° C. 1.0 g of a hyperbranched polymer having a chlorine atom at a molecular terminal thereof (HPS-Cl) was obtained as a light orange powder (yield>99%).

The obtained HPS-Cl had a weight-average molecular weight Mw of 14,000 and a degree of distribution Mw/Mn of 2.9 which were measured by GPC in terms of polystyrene.

Example 2

By the same operation as in Example 1, except that the used amount of sulfuryl chloride was changed to 3.7 g (27 mmol, 4.8 equivalents relative to a DC group) and the used amount of cyclohexene was changed to 2.2 g (27 mmol), 1.1 g of HPS-Cl was obtained as an orange powder (yield>99%).

The obtained HPS-Cl had a weight-average molecular weight Mw of 12,000 and a degree of distribution Mw/Mn of 2.5 which were measured by GPC in terms of polystyrene.

Comparative Example 1

When the operation was performed in the same manner as in Example 1, except that the used amount of sulfuryl chloride was changed to 0.92 g (6.8 mmol, 1.2 equivalent relative to a DC group), immediately after the HPS/chloroform solution was charged, a light yellow insoluble substance was deposited. The insoluble substance could not be dissolved when it was subjected to heating-reflux thereafter, so that the objective HPS-Cl could not be obtained.

Comparative Example 2

When the operation was performed in the same manner as in Example 1, except that the used amount of sulfuryl chloride was changed to 1.8 g (14 mmol, 2.4 equivalent relative to a DC group), immediately after the HPS/chloroform solution was charged, a light yellow insoluble substance was deposited. The insoluble substance could not be dissolved when it was subjected to heating-reflux thereafter, so that the objective HPS-Cl could not be obtained.

Example 3

Into a 50 mL reaction flask, 1.5 g (5.7 mmol as a DC group) of a hyperbranched polymer HPS having a DC group at a molecular terminal thereof and 7.5 g of chloroform were charged and the resultant mixture was stirred in a nitrogen stream until the mixture became homogeneous.

Into another 50 mL two-neck flask, 2.7 g (20 mmol, 3.6 equivalent relative to a DC group) of sulfuryl chloride [manufactured by Kishida Chemical Co., Ltd.] and 7.5 g of chloroform were charged and the resultant mixture was stirred to be dissolved homogeneously, followed by purging the inside of the reaction system with nitrogen. Into the sulfuryl chloride/chloroform solution, the above HPS/chloroform solution was charged over 60 minutes while maintaining the temperature of the reaction mixture at 25° C. After the charging, while maintaining the temperature as it was, the reaction mixture was stirred for 6 hours.

Then, to the reaction mixture, 1.7 g (20 mmol, 1.0 equivalent relative to sulfuryl chloride) of cyclohexene [manufactured by Tokyo Chemical Industry Co., Ltd.] was added while maintaining the temperature of the reaction mixture at 25° C. After the addition, the resultant reaction mixture was charged into 60 g of IPA to precipitate a polymer. The precipitate was filtered to obtain a powder which was washed with 10 g of IPA and 10 g of methanol in this order and was vacuum-dried at 50° C. 0.82 g of a hyperbranched polymer having a chlorine atom at a molecular terminals thereof (HPS-Cl) was obtained as a white powder (yield>99%).

The obtained HPS-Cl had a weight-average molecular weight Mw of 12,000 and a degree of distribution Mw/Mn of 2.6 which were measured by GPC in terms of polystyrene. $^1$H NMR spectrum of the obtained HPS-Cl is shown in FIG. 1. Peaks (4.0 ppm, 3.7 ppm) attributed to a DC group disappeared, so that it became apparent that in the obtained HPS-Cl, almost all DC groups at molecular terminals of HPS were substituted with chlorine atoms.

Comparative Example 3

Into a 50 mL reaction flask, 2.7 g (20 mmol, 3.6 equivalent relative to a DC group of HPS described below) of sulfuryl chloride [manufactured by Kishida Chemical Co., Ltd.] and 7.5 g of chloroform were charged and the resultant mixture was stirred in a nitrogen stream until the mixture became homogeneous.

Into another 50 mL two-neck flask, 1.5 g (5.7 mmol as a DC group) of a hyperbranched polymer HPS having a DC group at a molecular terminal thereof and 7.5 g of chloroform were charged and the resultant mixture was stirred to be dissolved homogeneously, followed by purging the inside of the reaction system with nitrogen. Into the HPS/chloroform solution, the above sulfuryl chloride/chloroform solution was charged over 60 minutes while maintaining the temperature of the reaction mixture at 25° C. However, at the charging, a light yellow insoluble substance was deposited simultaneously, so that the objective HPS-Cl could not be obtained.

Example 4

By the same operation as in Example 3, except that each of the temperature at the charging of the HPS/chloroform solution, the reaction temperature thereafter, and the temperature at the addition of cyclohexene was changed to −15° C., 0.78 g of HPS-Cl was obtained as a white powder (yield>99%).

The obtained HPS-Cl had a weight-average molecular weight Mw of 12,000 and a degree of distribution Mw/Mn of 2.6 which were measured by GPC in terms of polystyrene.

Example 5

By the same operation as in Example 3, except that each of the temperature at the charging of the HPS/chloroform solution, the reaction temperature thereafter, and the temperature at the addition of cyclohexene was changed to 0° C., 0.81 g of HPS-Cl was obtained as a white powder (yield>99%).

The obtained HPS-Cl had a weight-average molecular weight Mw of 12,000 and a degree of distribution Mw/Mn of 2.6 which were measured by GPC in terms of polystyrene.

Example 6

By the same operation as in Example 3, except that each of the temperature at the charging of the HPS/chloroform solution, the reaction temperature thereafter, and the temperature at the addition of cyclohexene was changed to 35° C., 0.77 g of HPS-Cl was obtained as a white powder (yield>99%).

The obtained HPS-Cl had a weight-average molecular weight Mw of 12,000 and a degree of distribution Mw/Mn of 2.6 which were measured by GPC in terms of polystyrene.

Example 7

By the same operation as in Example 3, except that each of the temperature at the charging of the HPS/chloroform solution, the reaction temperature thereafter, and the temperature at the addition of cyclohexene was changed to 40° C., 0.78 g of HPS-Cl was obtained as an orange powder (yield>99%).

The obtained HPS-Cl had a weight-average molecular weight Mw of 12,000 and a degree of distribution Mw/Mn of 2.7 which were measured by GPC in terms of polystyrene.

Although the obtained HPS-Cl was subjected repeatedly twice to a re-precipitation operation (dissolving the polymer in chloroform and charging the resultant solution into IPA) using chloroform and IPA, the color of the colored powder could not be removed, so that the powder remained in orange color.

Example 8

By the same operation as in Example 3, except that each of the temperature at the charging of the HPS/chloroform solution, the reaction temperature thereafter, and the temperature at the addition of cyclohexene was changed to a reflux temperature (about 61° C.) of the reaction mixture, 0.84 g of HPS-Cl was obtained as an orange powder (yield>99%).

The obtained HPS-Cl had a weight-average molecular weight Mw of 12,000 and a degree of distribution Mw/Mn of 2.6 which were measured by GPC in terms of polystyrene.

Although the obtained HPS-Cl was subjected repeatedly twice to a re-precipitation operation (dissolving the polymer in chloroform and charging the resultant solution into IPA) using chloroform and IPA, the color of the colored powder could not be removed, so that the powder remained in orange color.

Comparative Example 4

The operation was performed in the same manner as in Example 3, except that instead of sulfuryl chloride, 1.6 g (14 mmol, 2.4 equivalents relative to a DC group of the used HPS) of thionyl chloride was used. After about 1 hour from the charging of the HPS/chloroform solution, a light yellow insoluble substance was deposited. The insoluble substance was not dissolved even when the reaction mixture was heated to a reflux temperature (about 61° C.) of the reaction mixture, so that the objective HPS-Cl could not be obtained.

Comparative Example 5

The operation was performed in the same manner as in Example 3, except that instead of sulfuryl chloride, 2.4 g (20 mmol, 3.6 equivalent relative to a DC group of the used HPS) of thionyl chloride was used. After about 1 hour from the charging of the HPS/chloroform solution, a light yellow insoluble substance was deposited. The insoluble substance was not dissolved even when the reaction mixture was heated to a reflux temperature (about 61° C.) of the reaction mixture, so that the objective HPS-Cl could not be obtained.

Example 9

Into a 20 L reaction vessel, 1.28 kg (9.50 mol, 3.6 equivalent relative to a DC group of HPS described below) of sulfuryl chloride [manufactured by Kishida Chemical Co., Ltd.] and 2.35 kg of chloroform were charged and the resultant mixture was stirred to be dissolved homogeneously. The resultant solution was cool down to 0° C. in a nitrogen stream.

Into another 10 L reaction vessel, 700 g (2.64 mol as a DC group) of a hyperbranched polymer HPS having a DC group at a molecular terminal thereof and 7.00 kg of chloroform were charged and the resultant mixture was stirred in a nitrogen stream until the mixture became homogeneous. The resultant solution was transferred into a 3 L separatory funnel attached to the above 20 L reaction vessel by a pump in a nitrogen stream.

Into the above sulfuryl chloride/chloroform solution cooled down to 0° C., the HPS/chloroform solution transferred into a 3 L separatory funnel was added in a nitrogen stream over 60 minutes so that the temperature of the reaction mixture became −5±5° C. After the completion of the addition, while maintaining the temperature of the reaction mixture at −5±5° C., the reaction mixture was stirred for 6 hours.

Further, into the reaction mixture, a solution prepared by dissolving 0.78 kg (9.50 mol, 1.0 equivalent relative to sulfuryl chloride) of cyclohexene [manufactured by Tokyo Chemical Industry Co., Ltd.] in 2.35 kg of chloroform was charged so that the temperature of the reaction mixture became −5±5° C. After the charging, the reaction mixture was charged into 46.7 kg of IPA to precipitate a polymer. The precipitate was filtered to obtain a white powder which was washed with 5.25 kg of IPA and was vacuum-dried at 40° C. 399 g of a hyperbranched polymer (HPS-Cl) having a chlorine atom at a molecular terminal thereof was obtained as a white powder (yield: 99%).

The obtained HPS-Cl had a weight-average molecular weight Mw of 14,000 and a degree of distribution Mw/Mn of 2.5 which were measured by GPC in terms of polystyrene.

The results of Example 1 to Example 9 and Comparative Example 1 to Comparative Example 5 are shown altogether in Table 1 below.

TABLE 1

| | $SO_2Cl_2$ amount*[1] | Charging order*[3] | Reaction temperature | Shape | Mw | Mw/Mn |
|---|---|---|---|---|---|---|
| Example 1 | 3.6 | HPS→$SO_2Cl_2$ | 61° C. | Light orange powder | 14,000 | 2.9 |
| Example 2 | 4.8 | HPS→$SO_2Cl_2$ | 61° C. | Orange powder | 12,000 | 2.5 |
| Example 3 | 3.6 | HPS→$SO_2Cl_2$ | 25° C. | White powder | 12,000 | 2.6 |
| Example 4 | 3.6 | HPS→$SO_2Cl_2$ | −15° C. | White powder | 12,000 | 2.6 |
| Example 5 | 3.6 | HPS→$SO_2Cl_2$ | 0° C. | White powder | 12,000 | 2.6 |
| Example 6 | 3.6 | HPS→$SO_2Cl_2$ | 35° C. | White powder | 12,000 | 2.6 |
| Example 7 | 3.6 | HPS→$SO_2Cl_2$ | 40° C. | Orange powder | 12,000 | 2.7 |

TABLE 1-continued

| | SO$_2$Cl$_2$ amount*1 | Charging order*3 | Reaction temperature | Shape | Mw | Mw/Mn |
|---|---|---|---|---|---|---|
| Example 8 | 3.6 | HPS→SO$_2$Cl$_2$ | 61° C. | Orange powder | 12,000 | 2.6 |
| Example 9 | 3.6 | HPS→SO$_2$Cl$_2$ | −5° C. | White powder | 14,000 | 2.5 |
| Comparative Example 1 | 1.2 | HPS→SO$_2$Cl$_2$ | 61° C. | Light yellow insoluble substance | — | — |
| Comparative Example 2 | 2.4 | HPS→SO$_2$Cl$_2$ | 61° C. | Light yellow insoluble substance | — | — |
| Comparative Example 3 | 3.6 | SO$_2$Cl$_2$→HPS | 25° C. | Light yellow insoluble substance | — | — |
| Comparative Example 4 | 3.6*2 | HPS→SOCl$_2$ | 25° C. | Light yellow insoluble substance | — | — |
| Comparative Example 5 | 4.8*2 | HPS→SOCl$_2$ | 25° C. | Light yellow insoluble substance | — | — |

*1Mole equivalent of sulfuryl chloride relative to number of moles of dithiocarbamate group in hyperbranched polymer
*2Mole equivalent of thionyl chloride
*3HPS→SO$_2$Cl$_2$: charging hyperbranched polystyrene into sulfuryl chloride solution SO$_2$Cl$_2$→HPS: charging sulfuryl chloride into hyperbranched polystyrene solution From the results of Example 1 and Example 2 and Comparative Example 1 and Comparative Example 2, it was confirmed that in the case (Comparative Example 1 and Comparative Example 2) where the amount of used sulfuryl chloride is 2.4 equivalent or less relative to a DC group, the reaction system was insolubilized and then, the objective HPS-Cl could not be obtained, so that at least 2.5 equivalent or more of sulfuryl chloride was necessary.

From the results of Example 3 and Comparative Example 3, it was confirmed that by a method of charging the sulfuryl chloride/chloroform solution into the HPS/chloroform solution, the reaction system was insolubilized and then, the objective HPS-Cl could not be obtained, and that by a method of charging the HPS/chloroform solution into the sulfuryl chloride/chloroform solution, a desired HPS-Cl could be obtained.

Further, from the results of Example 4 to Example 8, it was confirmed that even when the reaction temperature was changed from −15° C. to 61° C., a powder of the objective HPS-Cl could be obtained and particularly, at a reaction temperature of −15° C. to 35° C., the objective product could be obtained in a form of a white powder.

Here, as shown in Example 9, by the present production method, even in a mass production on the industrial scale, the objective HPS-Cl could be stably obtained.

Then, from the results of Comparative Example 4 and Comparative Example 5, it was confirmed that when thionyl chloride was used instead of sulfuryl chloride, the reaction system was insolubilized and then, the objective HPS-Cl could not be obtained.

PRIOR ART DOCUMENTS

Non-patent Documents

Non-patent Document 1: Koji Ishizu, Akihide Mori, Macromol. Rapid Commun. 21, 665-668 (2000)

Non-patent Document 2: Koji Ishizu, Akihide Mori, Polymer International, 50, 906-910 (2001)

Non-patent Document 3: Koji Ishizu, Yoshihiro Ohta, Susumu Kawauchi, Macromolecules, Vol. 35, No. 9, 3781-3784 (2002)

Non-patent Document 4: Koji Ishizu, Takeshi Shibuya, Akihide Mori, Polymer International, 51, 424-428 (2002)

Non-patent Document 5: Koji Ishizu, Takeshi Shibuya, Susumu Kawauchi, Macromolecules, Vol. 36, No. 10, 3505-3510 (2003)

Non-patent Document 6: Koji Ishizu, Takeshi Shibuya, Jaebum Park, Satoshi Uchida, Polymer International, 53, 259-265 (2004)

The invention claimed is:

1. A production method of a chlorinated hyperbranched polymer for producing a chlorinated hyperbranched polymer of Formula (1):

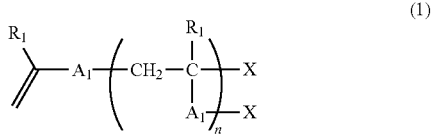

{where X is a chlorine atom; R$_1$ is a hydrogen atom or a methyl group; and A$_1$ is a structure of Formula (2):

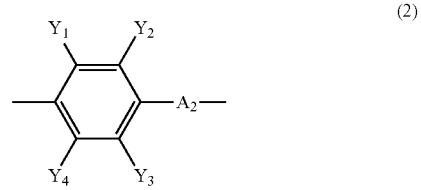

(where A$_2$ is a linear, branched, or cyclic alkylene group having a carbon atom number of 1 to 30 optionally containing an ether bond or an ester bond; and each of Y$_1$, Y$_2$, Y$_3$, and Y$_4$ is a hydrogen atom, a C$_{1-20}$ alkyl group, a C$_{1-20}$ alkoxy group, a nitro group, a hydroxy group, an amino group, a carboxy group, or a cyano group); and n is the number of repeating unit structures and is an integer of 2 to 100,000}, the production method comprising:

the step of substituting a dithiocarbamate group of a hyperbranched polymer of Formula (3):

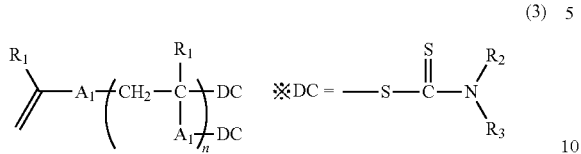

(where $R_1$, $A_1$, and n are the same as defined in Formula (1); and each of $R_2$ and $R_3$ is a $C_{1-5}$ alkyl group, a $C_{1-5}$ hydroxyalkyl group, or a $C_{7-12}$ arylalkyl group, or $R_2$ and $R_3$ optionally form a ring together with a nitrogen atom bonded to $R_2$ and $R_3$) having a dithiocarbamate group at a molecular terminal of the hyperbranched polymer, with a chlorine atom using sulfuryl chloride, wherein in the step of substituting a dithiocarbamate group of the hyperbranched polymer of Formula (3) having a dithiocarbamate group at a molecular terminal of the hyperbranched polymer with a chlorine atom is performed by charging all at once, continuously, or in fractional amounts, the hyperbranched polymer having a dithiocarbamate group at a molecular terminal of hyperbranched polymer into a solution of sulfuryl chloride in an organic solvent; and using sulfuryl chloride in an amount of 2.5 to 10 times mole equivalent relative to the number of dithiocarbamate groups.

2. The production method according to claim 1, wherein the step of substituting a dithiocarbamate group of the hyperbranched polymer of Formula (3) having a dithiocarbamate group at a molecular terminal of the hyperbranched polymer with a chlorine atom is performed under a condition of a temperature of −20° C. or more and 35° C. or less.

* * * * *